United States Patent [19]

Toth

[11] Patent Number: 5,302,411
[45] Date of Patent: Apr. 12, 1994

[54] PROCESS FOR VULCANIZING INSULATED WIRE

[76] Inventor: Endre Toth, 89 Smith St., Greenville, R.I. 02828

[21] Appl. No.: 901,732

[22] Filed: Jun. 22, 1992

Related U.S. Application Data

[63] Continuation-in-part of Ser. No. 643,221, Jan. 22, 1991, abandoned.

[51] Int. Cl.⁵ ............................ B05D 3/02; B05D 3/06
[52] U.S. Cl. ................................... 427/8; 427/521; 427/120
[58] Field of Search .............. 219/390, 388; 392/417; 427/521, 372.2, 379, 120, 8

[56] References Cited

U.S. PATENT DOCUMENTS

| | | | |
|---|---|---|---|
| 3,413,441 | 11/1968 | Isobe et al. | 219/390 |
| 4,234,624 | 11/1980 | Linderoth et al. | 427/388.2 |
| 4,295,033 | 10/1981 | Lindgren et al. | 219/390 |
| 4,372,898 | 2/1983 | Menges et al. | 264/22 |
| 4,596,922 | 6/1986 | Erickson | 219/390 |
| 4,701,348 | 10/1987 | Neville | 427/314 |

*Primary Examiner*—Shrive Beck
*Assistant Examiner*—Katherine A. Bareford
*Attorney, Agent, or Firm*—Barlow & Barlow, Ltd.

[57] ABSTRACT

A method and apparatus for continuously curing crosslinkable polymers in a ceramic or refractory tunnel whose interior surface is coated with a material exhibiting excellent emissivity. The ceramic tunnel is energized by a heat source consisting of nicrome or equivalent wires and when coated with a metallic oxide material such as titanium dioxide colored to a black hue, or equivalent high emissivity materials, the tunnel performs as a black body radiator.

5 Claims, 1 Drawing Sheet

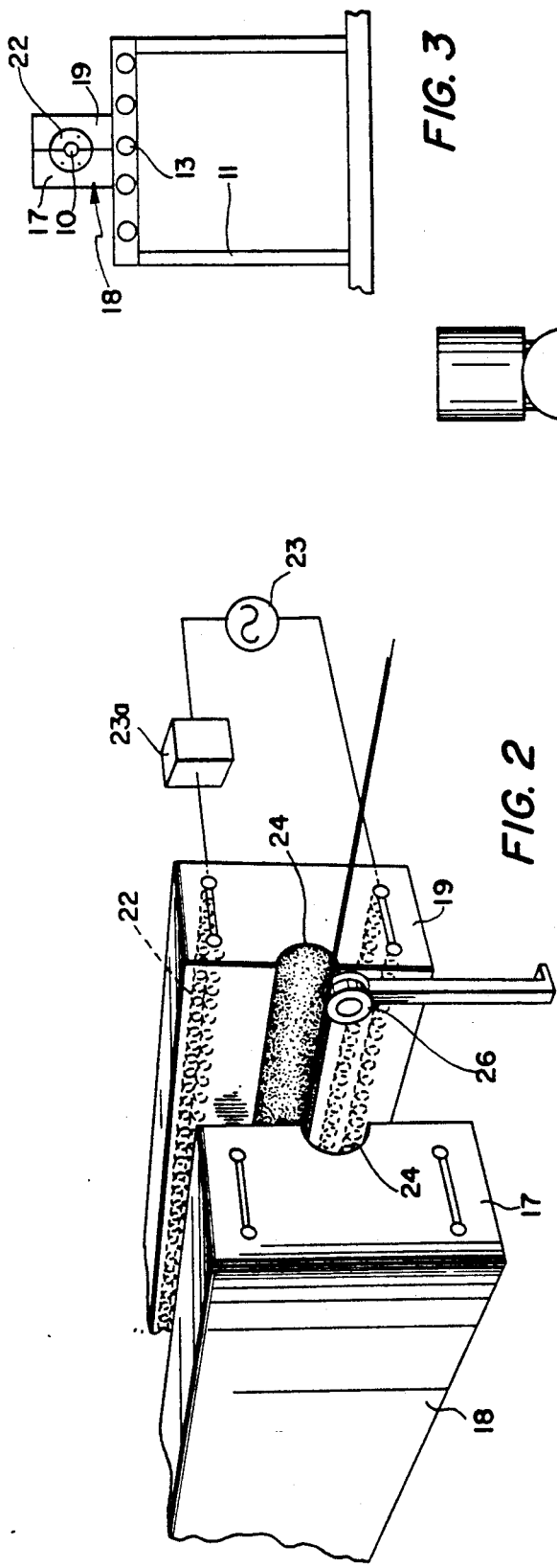
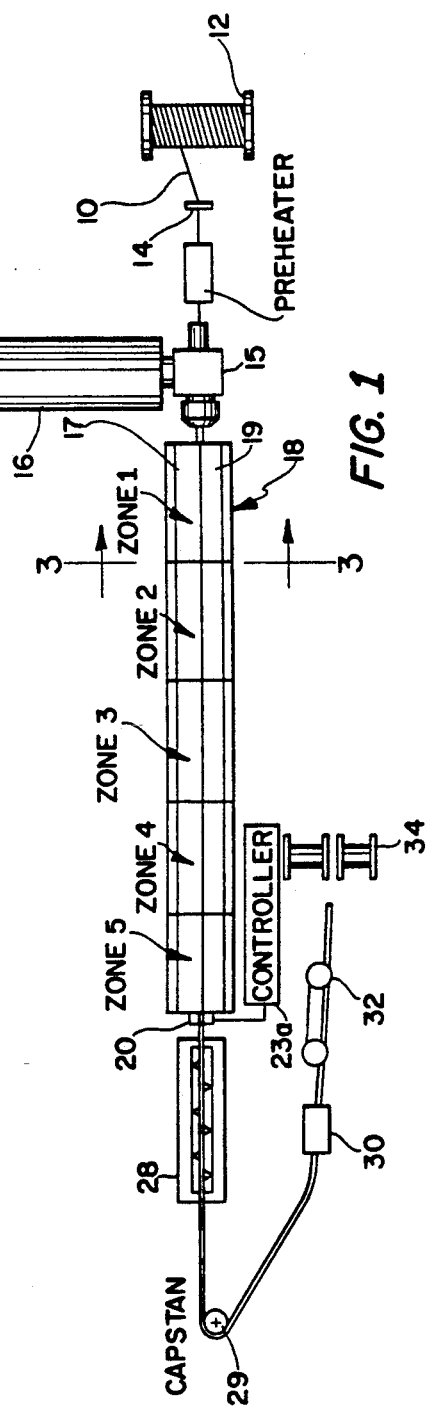
FIG. 1
FIG. 2
FIG. 3

PROCESS FOR VULCANIZING INSULATED WIRE

CROSS REFERENCE TO RELATED APPLICATION

This application is a continuation-in-part of my prior application Ser. No. 07/643,221, filed Jan. 22, 1991, now abandoned.

BACKGROUND OF INVENTION

During the manufacture of insulated wire, it is the usual practice to apply the insulating rubber or polymer layer by extruding it over the wire core and then subjecting the layer to a vulcanizing treatment. In the past, saturated steam has been used as the heating agent for cross-linking rubber-like plastics on the electrical wire. In order to operate properly, it has been common in the trade to utilize a pressure of at least 15 kg/sq.cm. to maintain a temperature of about 200° C. This aspect of the prior art is described in the patent of MIYAUCHI No. 3,513,228; the patent of CHRISMAN No. 3,901,633 describes a similar process, using pressurized gas. Another method of vulcanizing that has been used in the past is that of using a conductive coating, as is shown and described in the Defense Publication of DAY No. T-905,001, and patents of LINDSAY No. 2,458,864, and of HOPPE No. 3,387,079. A method of vulcanizing that uses the heating of the wire core by passing an electrical current through it is described in the patent of KITSEE No. 768,755.

In some prior art systems, the wire core itself is heated in the manner shown in the patents of BALTHIS No. 2,308,638, of FLAHERTY No. 3,263,268, and of STINGER No. 4,117,189. The use of radiant heat for the vulcanization is shown and described in the patents of MIYAUCHI No. 3,513,228 and 3,635,621, as well as the patent to NAKAMURA No. 3,588,954 and the patents of KARPPO No. 4,035,129 and 4,155,695. Ultrasonics have been suggested for this purpose, as described in the patent of SENAPATI No. 4,548,771. Considerable work has been done in the past with respect to vulcanizing by the use of high-frequency magnetic fields and of microwave energy. This work has been described in the patents of DODGE No. 3,354,243 (metal powder in the polymer), of MENGES No. 4,372,898, of BABBIN No. 4,512,942, of SCHULZ No. 4,514,162, of WANG No. 4,626,642, of THORSRUD No. 4,661,299, of SEJIMO NO. 4,702,867, of NAKAGAWA No. 4,497,759, of GREENE No. 3,642,532, and of ITOH No. 4,481,159.

These prior art methods and apparatus have suffered from a number of disadvantages. The steam system, for instance, supplies the vulcanization heat through a steam pipe that is 250-500 feet in length. The steam must be generated and the pressure regulated, resulting in a high insulation and maintenance cost for the equipment; vapor tends to become trapped in the polymer layer, thus impairing the insulation dielectric strength. The production speed is dictated by the steam pipe length and it is difficult to run small-sized wire, because of the likelihood of breakage in such a long piece of equipment. Furthermore, when pressure is used, the polymer tends to be pressed into interstices, particularly in stranded wire, so that the finished insulated wire is difficult to strip during installation in the field. The other methods have similar drawbacks. These and other difficulties experienced with the prior art devices have been obviated in a novel manner by the present invention.

It is, therefore, an outstanding object of the invention to provide a method for vulcanizing wire insulation in which heat is transferred by radiation, so that it is not necessary to heat a medium, as in the case of steam or gas.

Another object of this invention is the provision of a vulcanization system in which radiation penetrates the material, thereby giving a uniform heat distribution inward from the surface.

A further object of the present invention is the provision of wire insulation vulcanization in which the heat is readily available and there is no waiting time and no medium that must be heated and pressure-stabilized.

A still further object of the invention is the provision of a insulated wire vulcanization system, in which the path is relatively short, so that no problems are encountered in the production of fine wire.

It is a further object of the invention to provide apparatus for the vulcanization of insulated wire, which apparatus is simple and rugged in construction, which can be manufactured inexpensively, which is capable of a long life of useful service with a minimum of maintenance, and which provides easy and responsive control of temperature.

Another object of the invention is the provision of a vulcanization system that does not use a vapor medium, so that moisture or gas bubbles are not formed and the dielectric strength of the insulation is uniform; no pressure is involved, so that the insulation is not pressed into interstices and the finished product is easily stripped in the field.

With these and other objects in view, as will be apparent to those skilled in the art, the invention resides in the combination of parts set forth in the specification and covered by the claims appended hereto.

SUMMARY OF THE INVENTION

In general, the invention consists of a method and apparatus for continuously curing cross-linkable material on a longitudinally-extending metallic product, which involves the use of a curing chamber having a series of zones, each of which consists of a radiant heating element embedded in a refractory, ceramic, or mica casing, having a central bore coated with a metal oxide. The metal oxide functions as a black body radiator to cure the material. The material may be rubber or plastic and, in proceeding with the method, the chamber is heated to the required temperature by electrical current. It has been found that the length of the heating zone can be about 20 times shorter than that of a steam apparatus and, by utilizing a plurality of serially connected casings, the temperature distribution along the chambers can be selected as required. This results in the obtaining of an optimization of the heating, thereby using several times less energy to vulcanize the same amount of insulating mass.

BRIEF DESCRIPTION OF THE DRAWINGS

The character of the invention, however, may be best understood by reference to one of its structural forms, as illustrated by the accompanying drawings, in which:

FIG. 1 is a schematic view of the apparatus for practicing the present invention, and FIG. 2 is a perspective view, partly broken away, that illustrates the curing chamber apparatus constructed in accordance with the principles of the invention, and FIG. 3 is a vertical sectional view of the apparatus, taken on the line 3—3 of FIG. 2.

DESCRIPTION OF THE PREFERRED EMBODIMENT

The present invention uses radiant energy to heat a black body. The energy is emitted in the form of electromagnetic transverse waves from the black body at a frequency that is directly proportional to the absolute temperature behind the black body. A wavelength of 3 to 4 microns (100,000 to 75,000 MHz) of electromagnetic radiation is the most efficient to cure the majority of thermosetting materials. If radiation can be preselected to obtain a desirable wavelength (and it is known for certain materials that wavelength to which the chemical reaction responds), then, for a minimum of resident time, curing can be accomplished. For example, the resident time for most silicone compounds has been found to be 1 to 1½ seconds at 95,600 MHz, which compares with 60 seconds in a steam curing chamber.

Referring now to FIG. 1 of the drawings, a wire processing line is illustrated. The wire 10 is carried on a reel 12 that is mounted in a payoff apparatus and is guided by element 14 into the cross-head 15 of an extruder 16. The coated wire exits the extruder at extrusion temperature and enters the vulcanizing unit 18 of the instant invention. A thermocouple controls the body temperature of each section of the unit 18. At the exit of unit 18, an infra-red sensor 20 controls the mass temperature. This sensor is set to the vulcanization temperature of the insulating material. At the same time, the mass controller supervises (through the slave controller) the temperature of the body 18 of the unit to a narrow on-off band to reduce overshoot. The unit 18, of which a section thereof is illustrated in FIG. 3, is a split casing made from blocks 17 and 19 of refractory ceramic fiber material into which, as disclosed herein, is embedded a Nichrome wire 22. For example, a tungsten wire heater is also suitable. The wire is energized from a source of energy 23 through controller 23a. The radiant heaters are adjustable for different polymer materials by adjusting the temperature of the tunnel.

The unit 18 is carried on a support 11 which is provided with rollers 13 to facilitate separation of the halves of the unit during certain parts of the curing cycle to prevent melting of the coated wire.

The casing essentially has a central bore 24 when in the closed position and, on the surface of this bore, there is a coating of a metal oxide such as titanium dioxide to which ferrous oxide has been added to change the hue of the material to substantially black. The refractory or ceramic material with this coating functions in accordance with the black body principle and radiates electromagnetic energy at a frequency proportional to the absolute temperature of the body. Essentially it is important to have a coating material that has good emissivity, particularly at elevated temperatures. After extensive tests, a material was found that is sold under the tradename ILMENITE. Chemically it is essentially $FeTiO_3$ and has an emissivity at 1000° F.(538° C.) of 0.90 that rose to 0.97 at 3000° F.(1649° C.). Zirconium oxide, $ZrO_2$, colored to a black hue is a further alternate. Other coatings have been tried, for example PYROMAX, which has a similar emissivity and is rated to 1370° C., but it burns off at that temperature. Mica fiber has an emissivity of approximately 0.7 up to 1200° C. only and uncoated ceramic bodies have an emissivity of 0.79 at 540° C. that drop to 0.38 at 950° C. Thertefore with the proper coating, the emission can be maximized.

Until the wire line is running, the casings of unit 18 will be in the open position to prevent melting of the wire. While in the open position, the wire guides 26 will hold the wire in position away from the radiating surface of the bore. After exiting the unit 18, the wire will pass through a cooling unit 28 and thence onto a capstan 29 which pulls the wire through the unit 18. The wire exits through a spark tester 30 and onto a dancer 32 and a dual take-up 34, all of which is conventional in the wire industry.

Following are examples of applications of the invention:

EXAMPLE 1

A copper conductor having a nominal cross-sectional area of 0.004 in$^2$ (2.5 mm$^2$). was covered to a thickness of approximately 0.030" (0.77 mm) with an uncured silicone rubber compound, which has a specific gravity of 1.3. It was then passed through a series of casings of unit 18, having a length of 18 feet (5.4 m) and at a speed of 350 ft/min. (106 m/min). The black body for this run was raised to a temperature of approximately 1000° F. (538° C.) and produced an electromagnetic radiation of approximately 84 GHz (3.5 u). An examination of the end product showed complete cross-linking.

EXAMPLE 2

Two copper conductor wires, in parallel, each having a nominal cross-sectional area of 0.002 in$^2$ (1.3 mm$^2$) were covered to a thickness of 0.045" (1.14 mm) with an uncured compound of chlorosulphonated polyethylene, which has a specific gravity of 1.5. It was then passed through the series of casings of unit 18, having a length of 18 ft. (5.4 m) and a speed of 160 ft./min. (48.5 m/min) An examination of the end product showed complete cross-linking.

EXAMPLE 3

Four stranded copper conductors, each having a nominal cross-sectional area of 0.0045 in$^2$. (1.7 mm$^2$) were covered to a thickness of 0.040 "(1.0 mm) with an uncured silicone rubber compound which has a specific gravity of 1.29. It was then passed through a series of casings of unit 18 having a length of 18 feet at a speed of 250 ft/min. (76 m/min) An examination of the end product showed complete cross-linking.

EXAMPLE 4

A copper conductor having a nominal cross section of 2.08 mm$^2$ was covered with an uncured silicone rubber compound having an approximate thickness of 1 mm and was passed through casings 18 having a length of 18 ft. (5.4 m) at a speed of 270 ft per minute (82 m/min) The black body was raised to a temperature of approximately 1600° F. (870° C.) An examination of the end product showd complete cross linking.

The advantages of the present invention will be readily understood in view of the above description. Since vapor is not involved in the process, moisture or air bubbles are not formed and the dielectric strength of the insulation is uniform. Production speed can be at least doubled for the same wire, because the temperature is easily controllable within narrow limits. The residental time of the insulation in the casings is small, evidencing concetration of energy. For example 4, the residental time was approximately four seconds for a given particle. There is no upper or lower temperature limit;, since the temperature can be easily varied as the speed demands. Thin wire can be easily treated without danger of breakage, because of the fact that only a short span between supports is required. The operation is quite safe and set-up can take place rapidly with a saving of labor. No pressure on the uncured polymer layer takes place, so that the layer is not pressed into interstices, if the wire is of the stranded type; this means that it is easy to strip during electrical work in the field. Because of the short length of the apparatus, it is inexpensive; furthermore, there is no expensive auxiliary equipment involved.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed and desired to secure by Letters Patent is:

1. Process for continuously curing a polymer cross-linkable material on a wire, comprising applying the polymer material onto a continuous wire substrate to cover the wire, passing the covered substrate directly into a curing tunnel of refractory material having embedded radiant heaters at atmospheric pressure, coating the inner surface of the tunnel with a black colored material having an emissivity of at least 0.9, heating the inner surface of said tunnel with said radiant heaters to temperatures in excess of 1000° F. using the black body principle to cure the polymer material, monitoring an exit temperature of the substrate and polymer coating and sending a signal based on said exit temperature to a controller to adjust a temperature in the tunnel and then cooling the cured covered substrate.

2. Process as recited in claim 1, wherein the step of passing the substrate into the tunnel is carried out in a plurality of horizontal abutting tunnels said tunnels being centrally divided into two sections of C shape that are movable laterally of each other in the same plane.

3. Process as recited in claim 1, wherein the coating on the surface of the tunnel is a mixture of ferrous oxide and titanium dioxide.

4. Process as recited in claim 1 wherein the coating on the inner surface of the tunnel is a zirconium compound.

5. Process as recited in claim 1, wherein the radiant heaters are adjustable for different polymer materials by adjusting the temperature of the tunnel.

* * * * *